Sept. 29, 1959  W. W. STOLL ET AL  2,906,350
BEET HARVESTING MACHINE AND CLEARANCE DEVICE THEREFOR
Filed Dec. 21, 1955  3 Sheets-Sheet 2

INVENTOR
WALTER STOLL & ERICH REUTER
BY

Sept. 29, 1959 W. W. STOLL ET AL 2,906,350
BEET HARVESTING MACHINE AND CLEARANCE DEVICE THEREFOR
Filed Dec. 21, 1955 3 Sheets-Sheet 3

INVENTOR
WALTER STOLL & ERICH REUTER

2,906,350

BEET HARVESTING MACHINE AND CLEARANCE DEVICE THEREFOR

Walter Wilhelm Stoll and Erich Richard Reuter, Peine, Germany; said Reuter assignor to said Stoll Application December 21, 1955, Serial No. 554,445

Claims priority, application Germany December 24, 1954

1 Claim. (Cl. 171—10)

This invention relates to harvesting apparatus and more particularly to such apparatus for harvesting row root crops such as beets.

In beet harvesting machines now in use, plow like devices loosen the soil on opposite sides of a row of beets after which grippers engage and lift the beets onto a conveyor or drum by which the beets are agitated, tumbled or moved about to shake, scrape or knock off the soil adhering to the beets. The use of grippers for lifting the beets is disadvantageous, however, because these grippers also grip and lift a considerable amount of soil along with the beets, especially when the soil is damp or wet. Moreover, this lifted soil, especially when moist, adheres to the conveyor or drum so that the apparatus is ineffective in cleaning the soil from the beets. The inefficient cleaning of the beets is a decided disadvantage, particularly with sugar beets, because the sugar factories have strict requirements with respect to the amount of soil on the beets and make considerable deductions in the price paid for soiled beets.

Having in mind the defects of the prior art apparatus, it is the primary object of the present invention to provide an apparatus for harvesting row root crops such as beets with a minimum of soil adhering thereto.

It is another object of the invention to provide a harvesting apparatus of the aforementioned type which will lift the beets from the soil without materially loosening or disturbing the soil surrounding the beets prior to the lifting of the beets.

It is a further object of the invention to provide a harvesting apparatus of the aforementioned type and in which the lifting means is readily adjustable to accommodate crops of different sizes.

It is still another object of the invention to provide an apparatus for harvesting row root crops such as beets and having simplicity in design, economy in construction and efficiency in operation.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings wherein like reference characters indicate like parts through the several figures and in which:

Figure 1:
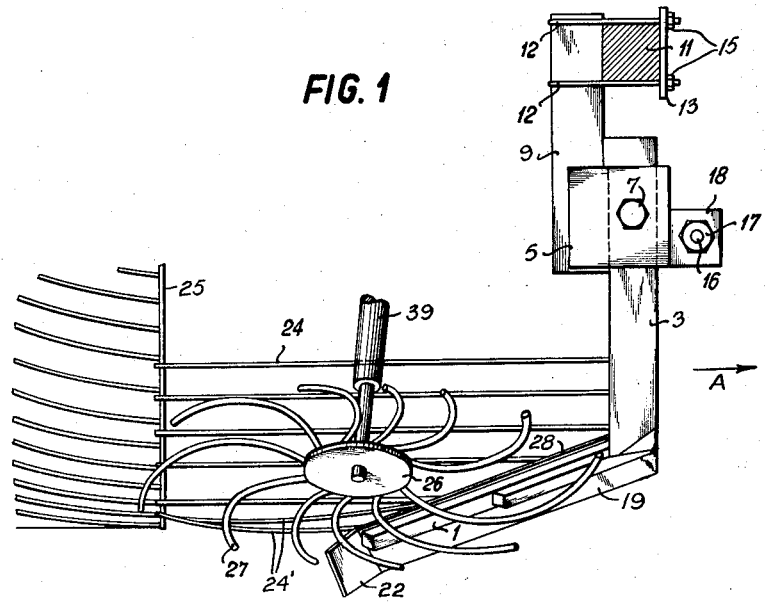
Fig. 1 is a side view in elevation of a row root crop harvesting apparatus in accordance with the present invention and associated with a fragmentarily illustrated cleaning drum.
Figure 2:
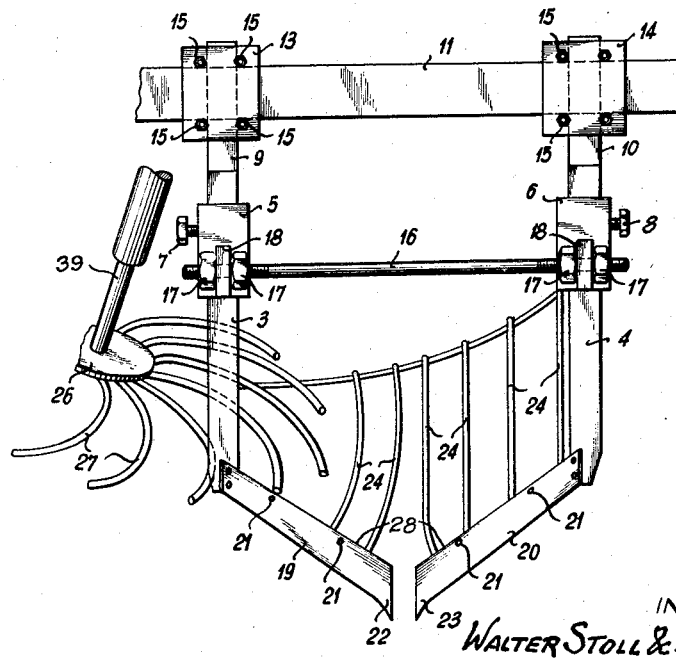
Fig. 2 is a front view in elevation of the apparatus shown in Fig. 1, the cleaning drum being omitted for clarity of illustration.

Referring now to the drawings, specifically to Figs. 1–4, a harvester in accordance with the present invention comprises a pair of shares 19 and 20 which, conveniently, are removably mounted by means of countersunk screws 21 on supporting bars 1 and 2 that are rigidly connected at their forward ends to the lower ends of uprights 3 and 4, respectively. The upper ends of the uprights 3 and 4 are adjustably supported in sleeves or sockets 5 and 6 and secured therein at selected elevations by clamp screws 7 and 8, respectively.

The sleeve sockets 5 and 6 are rigidly fixed on the lower ends of hanger bars 9 and 10, the upper end portions of which are adjustably secured to a cross-beam 11 by means of U-bolts 12. Preferably, there are a pair of U-bolts 12 for each hanger bar respectively above and below the beam 11 and in straddling relation to the hanger bars, the ends of the U-bolts passing through apertures in clamp plates 13 and 14, respectively, and secured by nuts 15. The hangers and uprights conveniently are braced by a tie rod 16 having threaded ends secured by nuts 17 to flanges 18 extending respectively from the sleeves 5 and 6.

The foregoing structure provides a rigid support for the shares 19 and 20 and enables ready adjustment of the shares both with respect to their relative spacing and their elevation relative to ground level. The U-bolt clamps 12, 13, 14 enable a relatively rough adjustment of the shares both laterally and vertically while the clamp screws 7, 8 enable a fine vertical adjustment and the rod 16 and nuts 17 a fine lateral adjustment of the shares 19 and 20.

Figure 3:
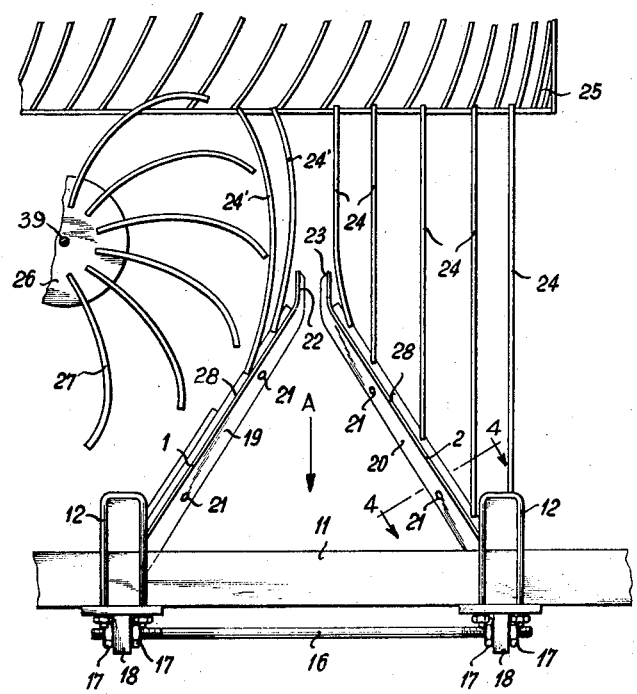
Fig. 3 is a plan view of the apparatus shown in Fig. 1.
Figure 4:
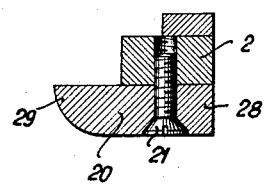
Fig. 4 is an enlarged cross-sectional view taken on line 4—4 of Fig. 3.

In use, the apparatus is moved in the directon of the arrow A, Figs. 1 and 3, and it will be seen that the shares 19 and 20 comprise relatively long narrow plates that are disposed longitudinally at an angle with respect to each other to define a V with the apex at their trailing ends and their leading ends widely spaced. In addition, these plates are disposed at an angle relative to the horizontal or ground level, Fig. 1, with their leading ends at a level spaced above the level of their trailing ends. Moreover, these plates are also disposed at an angle to the vertical so that transversely they are inclined inwardly from their upper longitudinal edges 28 and define a funnel-like channel, and the lower inner edges 29 are rounded, as best shown in Fig. 4. The plates are essentially straight and flat throughout the major portion of their length and have angular portions 22 and 23, respectively, which are substantially parallel to each other except for their transverse inclination, as best shown in Fig. 3. The shares 19 and 20 comprise the lifting means for initially lifting the beets from the soil.

Extending rearwardly from the shares 19 and 20 are conveying means which on one side comprises a plurality of generally parallel guide rods and on the other comprises a spider wheel and, if desired, a limited number of guide rods all of which lead to a cleaning drum or cage. In the modification of Figs. 1–4, the guide rods 24 are substantially straight and extend directly rearwardly to a cleaning drum 25 disposed on an axis substantially parallel with the direction of travel, these rods 24 being rigidly secured to and carried by the supporting bar 2 and the upright 4, and jointly form an inclined grating. A limited number of similar rods 24' may extend rearwardly from the inner rear end of the supporting bar 1 and immediately adjacent and outwardly of these rods 24', if they are used, is a spider wheel 26 having a plurality of curved but substantially coplanar, blunt ended tines 27, this wheel being carried at the lower end of a shaft 39 that is inclined inwardly and slightly forwardly so that the tines 27, with or without the rods 24' form an inclined grating which in cooperation with the grating formed by the bars 24 define an open foraminous trough leading from the shares 19 and 20 to the drum or cage 25. The shaft 39 may be driven by any suitable means, not shown, to facilitate movement of the beets from the lifting shares 19 and 20 to the drum 25 and the position and angle of the spider wheel 26 may be varied according to the number, if any, of guide rods 24'.

Figure 5:
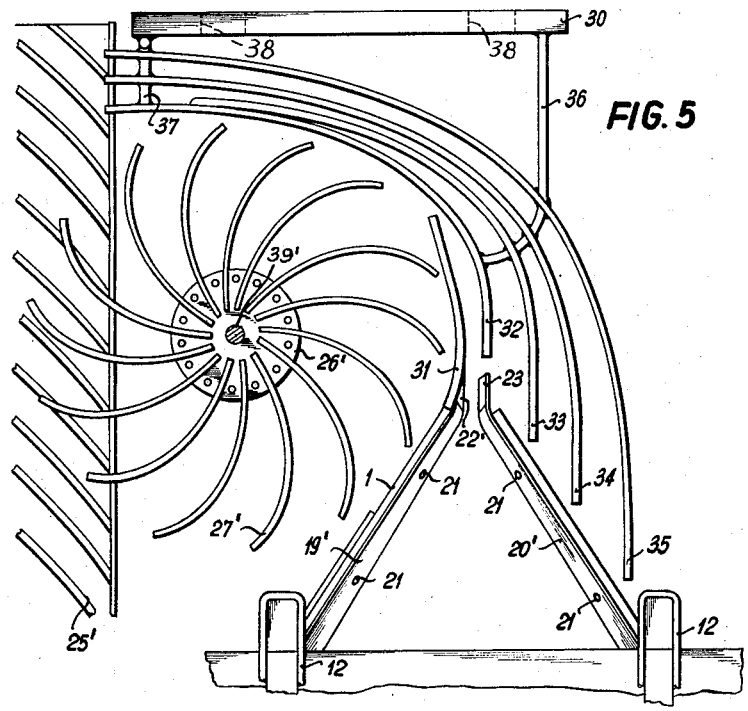
Fig. 5 is a plan view of a modification of the apparatus according to the invention.
Figure 6:
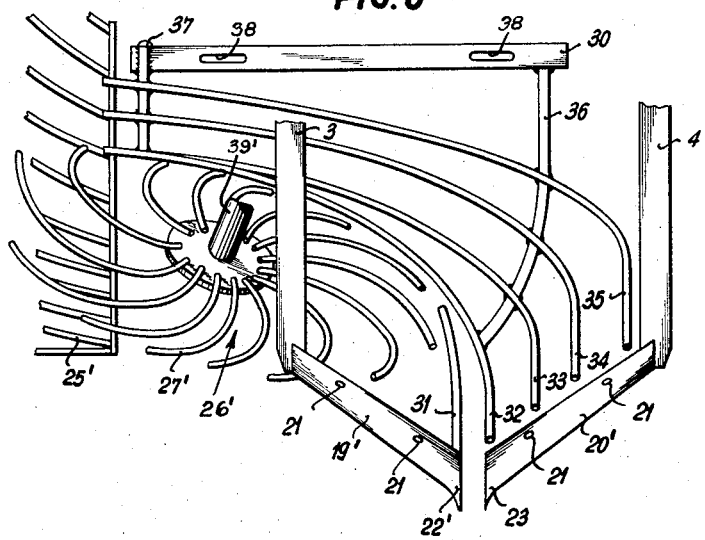
Fig. 6 is a front view in elevation of the apparatus shown in Fig. 5.

The conveying means and cleaning drum may be modified, as shown in Figs. 5 and 6, by positioning the cleaning drum 25' laterally of the lifting means and spider wheel 26' for rotation about an axis normal to the direction of travel. In this case, the spider wheel 26' may be supported by its shaft 39' closer to the adjacent share 19' so that the path of the ends of the tines 27' is substantially contiguous to the path of the trailing end portion 22' of the share 19' and grating or guide rods may be omitted. If desired, a single guide rod 31 may be secured to the end of the supporting bar 1 or the end portion 22' of the share 19'. The grating opposite the spider wheel 26' is composed of curved guide rods 32, 33, 34 and 35 which extend substantially from the share 20' around the spider wheel 26' to the drum 25'. Preferably, however, these curved rods are formed as a separate grating independent of the share 20' or its supporting frame 2, the rods being rigidly secured to hanger rods 36 and 37 which rigidly depend from a transverse cross-bar 30 having slots 38 longitudinally thereof for adjustable attachment to a cross-beam of the machine frame so that the grating may be adjusted laterally in accordance with the adjustment of the share 20'.

In operation, the shares are adjusted preferably with their trailing end portions 22, 23 or 22', 23', in slightly spaced relation according to the size of the beets or other row root crops to be harvested. These shares are also adjusted vertically so that their leading ends are spaced above the ground level but with their trailing end portions penetrating the ground. The adjustment of the shares is such that the converging, rounded lower edges 29 engage the ground substantially at the points along their length at which such points are relatively spaced substantially the diameter of the beets to be lifted. Thus, as the machine is moved along a row of beets, the rounded edges 29 of the downwardly inclined, rearwardly converging, funnel forming shares substantially simultaneously penetrate the ground and engage the opposite sides of a beet. As the shares do not engage the ground in advance of the beet to any material extent, the soil is not broken around the beet but instead, the beet is gently cammed, wedged or lifted upwardly from the soil and the soil is immediately plowed outwardly away from the beet. As the shares are advanced relative to the beet, the downward inclination and convergence of the edges 29 progressively descend along the more or less conical sides of the beet until the beet is entirely free from the soil. Accordingly, the beets are lifted from the ground without the adherence of any material amount of soil, the rounded edges gently lifting without cutting or damaging the beets.

As the beets are lifted from the ground, they are guided by the trailing share end portions 22, 23 or 22', 23' to the guide rods and spider wheel, this wheel being driven to move the beets along the gratings formed by the spider and guide rods to the cleaning drum 25 or 25', as the case may be. The tines 27 or 27' are curved in the direction of rotation and are blunt ended to preclude damage to the beets as they are engaged by the tines. In this manner, the beets are lifted from the ground without damage and substantially free of soil, and what little soil is carried with the beets is removed as they are moved along the grating by the spider wheel or tumbled in the drum or cage 25 or 25'.

Although certain specific embodiments of the invention have been shown and described, it is obvious that many modifications thereof are possible. The invention, therefore, is not to be restricted except insofar as is necessitated by the prior art and by the spirit of the appended claim.

What we claim is:

Apparatus for harvesting row root crops such as beets, comprising a pair of elongate shares having substantially straight lower edges and being substantially flat throughout the major portion of their length with a portion at one end of each share disposed at a slight angle, and means supporting said shares in longitudinally angular relation to define a V with the angled end portions at the apex thereof and at the trailing end with the widely spaced ends of said shares at the leading end in the direction of travel, said lower edges of said shares being inclined downwardly from the leading ends to the trailing ends thereof and the facing surfaces of said shares being inclined inwardly from their upper edges to their said lower edges to define a funnel-like channel converging toward the trailing ends of said shares, whereby in operation, the trailing portions of said shares may be inserted into the ground in straddling relation to a crop row and as advanced along the row, the lower edges of said shares will engage opposite sides of the individual crops and lift them from the ground while simultaneously plowing the soil away from the crops, a cleaning drum disposed rearwardly of said shares, and gratings disposed behind each of said shares and leading to said drum for directing the crops from the shares to the drum, said gratings disposed at angles and jointly defining a trough, the grating behind one of said shares including a plurality of generally parallel guide rods extending longitudinally from the share to the drum, and the grating behind the other share including a rotatable spider wheel for moving the crops along said trough to said drum.

References Cited in the file of this patent

UNITED STATES PATENTS

| | | |
|---|---|---|
| 331,724 | Lovejoy | Dec. 1, 1885 |
| 535,710 | Maxwell | Mar. 12, 1895 |
| 928,594 | Frankman | July 20, 1909 |
| 952,873 | Brown | Mar. 22, 1910 |
| 1,566,767 | Olsen | Dec. 22, 1925 |
| 2,651,901 | Roepke | Sept. 15, 1953 |

FOREIGN PATENTS

| | | |
|---|---|---|
| 736,816 | Germany | June 30, 1943 |
| 77,876 | Denmark | July 26, 1954 |